S. SCOVIL.
Stacking Scaffolds.

No. 150,795. Patented May 12, 1874.

Witnesses;
L. P. Himer
C. L. Euert

Inventor;
Sylvanus Scovil
By J. McC. Perkins
Attorney.

UNITED STATES PATENT OFFICE.

SYLVANUS SCOVIL, OF OAK CENTRE, WISCONSIN.

IMPROVEMENT IN STACKING-SCAFFOLDS.

Specification forming part of Letters Patent No. 150,795, dated May 12, 1874; application filed April 6, 1874.

*To all whom it may concern:*

Be it known that I, SYLVANUS SCOVIL, of Oak Centre, in the county of Fond du Lac and State of Wisconsin, have invented certain new and useful Improvements in Stacking-Scaffolds; and I do hereby declare the following to be a full, clear, and exact description thereof, reference being had to the accompanying drawing and to the letters of reference marked thereon.

The nature of my invention consists in the construction and arrangement of a scaffold for use in stacking hay and grain, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
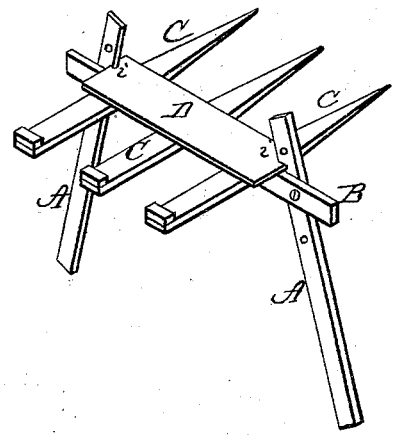
Figure 2:
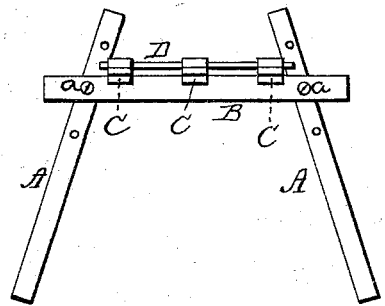
Figure 3:
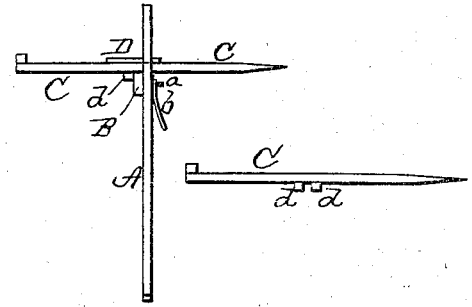

Figure 1 is a perspective view, Fig. 2 a front elevation, and Fig. 3 a side view, of my stacking-scaffold.

A A represent two posts of any suitable height and dimensions, having three or more holes through them at different distances from their ends. B represents a beam, connected to the posts A A by means of a bolt, $a$, at each end, which bolt passes through either of the holes in the post, and is fastened by means of a nut, $b$, having a lever or handle attached to it. C C represent forks or tines, each provided on its under side with two cross-cleats, $d\ d$, such a distance apart as to fit over the upper edge of the beam B. The frame A B being raised up alongside of the stack, the beam B being adjusted at any height desired, a suitable number of tines or forks, C C, are laid on the beam and the points inserted in the hay or grain stack. A platform, D, is then laid on top of the forks C C. This platform has a notch or slot, $i$, in each end, so that by spreading the lower ends of the posts or legs A A the upper parts thereof will incline inward and enter said slots, after which the nuts $b\ b$ are tightened, thereby securing the whole firmly together.

A man standing upon this scaffold can pile up or stack the hay or grain much higher than under ordinary circumstances, and with greater ease and rapidity.

The scaffold can be put up, and taken down, and readjusted in a very few moments of time; and it may be constructed of ordinary fence lumber, or almost any kind of lumber at hand.

Having thus fully described my invention, what I claim as new, and desire to secure by Letters Patent, is—

The combination of the perforated posts A A, adjustable beam B, forks or tines C C, and platform D, all constructed substantially as and for the purposes herein set forth.

In witness that I claim the foregoing I have hereunto set my hand this 2d day of April, 1874.

SYLVANUS SCOVIL.

In presence of—
    D. P. WARTON,
    W. H. TAYLOR.